(12) United States Patent
Sim

(10) Patent No.: US 11,545,016 B2
(45) Date of Patent: Jan. 3, 2023

(54) COMPUTER-READABLE MEDIUM, VEHICLE CONTROL SYSTEM, AND VEHICLE CONTROL METHOD

(71) Applicant: MANDO CORPORATION, Pyeongtaek-si (KR)

(72) Inventor: Sang Kyun Sim, Pyeongtaek-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 355 days.

(21) Appl. No.: 16/839,586

(22) Filed: Apr. 3, 2020

(65) Prior Publication Data

US 2020/0320841 A1    Oct. 8, 2020

(30) Foreign Application Priority Data

Apr. 4, 2019  (KR) .................. 10-2019-0039663

(51) Int. Cl.
*G08B 21/02* (2006.01)
*B60Q 9/00* (2006.01)
(Continued)

(52) U.S. Cl.
CPC ........... *G08B 21/0205* (2013.01); *B60Q 9/00* (2013.01); *B60R 16/0315* (2013.01);
(Continued)

(58) Field of Classification Search
CPC ...... G08B 21/0205; G08B 25/10; B60Q 9/00; B60R 16/0315; B60R 21/01556; B60R 21/01538; B60R 21/01542; B60R 21/01552; B60R 21/01566; E05F 15/72; E05F 15/73; E05F 2015/767; G06V 20/593; G06V 40/103; B60W 2420/42; B60W 2540/227; E05Y 2900/55; E05Y 2800/414; E05Y 2800/42; E05Y 2900/542; B60H 1/00742; B60H 1/00878; B60N 2/002; B60Y 2302/03; B60Y 2400/302

See application file for complete search history.

(56) References Cited

U.S. PATENT DOCUMENTS

2004/0240706 A1* 12/2004 Wallace ................... G06T 7/73
                                                         382/103
2008/0004774 A1*  1/2008 Wieczorek ............. B60R 21/00
                                                           701/45
(Continued)

FOREIGN PATENT DOCUMENTS

JP          5453230 B2 * 12/2010
KR       20180062884 A  * 12/2016

OTHER PUBLICATIONS

JP5453230B2 Translation (Year: 2010).*
KR20180062884A Translation (Year: 2016).*

*Primary Examiner* — Frederick M Brushaber
(74) *Attorney, Agent, or Firm* — Morgan, Lewis & Bockius LLP

(57) ABSTRACT

Provided is a vehicle control system and vehicle control method. The vehicle control system includes: one or more image sensors disposed on a vehicle to have a field of view of an inside of the vehicle and configured to capture image data and process the captured image data; and a controller configured to control the vehicle according to a state of a child existing in the vehicle on the basis of the image data.

17 Claims, 10 Drawing Sheets

(51) Int. Cl.
*B60R 16/03* (2006.01)
*E05F 15/73* (2015.01)
*G06V 20/59* (2022.01)
*E05F 15/72* (2015.01)

(52) U.S. Cl.
CPC .............. *E05F 15/72* (2015.01); *E05F 15/73* (2015.01); *G06V 20/593* (2022.01); *B60W 2420/42* (2013.01); *B60W 2540/227* (2020.02); *E05F 2015/767* (2015.01); *E05Y 2900/55* (2013.01)

(56) References Cited

U.S. PATENT DOCUMENTS

| | | | | |
|---|---|---|---|---|
| 2013/0201013 A1* | 8/2013 | Schoenberg | ............. | B60Q 1/00 340/438 |
| 2014/0253314 A1* | 9/2014 | Rambadt | ................ | B60N 2/002 340/457.1 |
| 2017/0043783 A1* | 2/2017 | Shaw | .................... | B60N 2/002 |

* cited by examiner

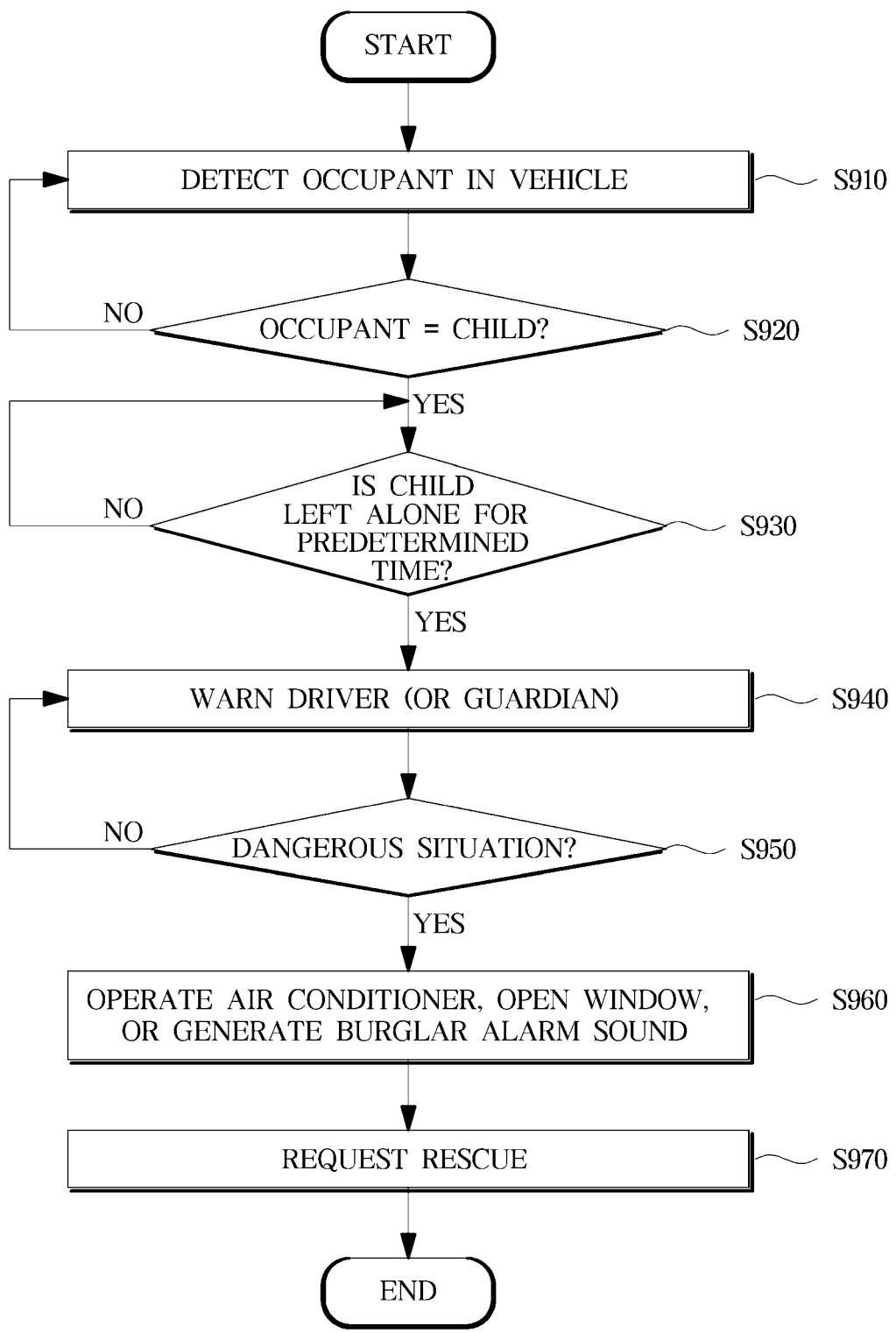

COMPUTER-READABLE MEDIUM, VEHICLE CONTROL SYSTEM, AND VEHICLE CONTROL METHOD

CROSS-REFERENCE TO RELATED APPLICATION

This application is based on and claims priority under 35 U.S.C. § 119 to Korean Patent Application No. 2019-0039663, filed on Apr. 4, 2019 in the Korean Intellectual Property Office, the disclosure of which is incorporated herein by reference.

BACKGROUND

1. Field

The present disclosure relates to a computer readable medium, a vehicle control system, and a vehicle control method.

2. Description of the Related Art

When accompanied by a child in a vehicle, the driver generally places the child in the rear seat or in a passenger seat of the vehicle.

In this case, the driver, when alighting the vehicle with inattention, may not recognize the existence of the child in the seat of the vehicle, which may result in the child being left alone in the vehicle.

In addition, when the driver intentionally alights the vehicle with the child left in the vehicle, the driver feels anxiety because the state of the child is not checked. In severe cases, the state of the child may deteriorate in a situation where the indoor temperature of the vehicle significantly increases or decreases, or the oxygen concentration in the vehicle significantly decreases. Accordingly, there is a need for a technology for controlling the vehicle in preparation for the above-described situation.

SUMMARY

Therefore, it is an object of the present disclosure to provide a computer readable medium, a vehicle control system, and a vehicle control method capable of accurately detecting a child among occupants in a vehicle.

It is another object of the present disclosure to provide a computer readable medium, a vehicle control system, and a vehicle control method capable of accurately detecting a child in a vehicle, and notifying a driver, a guardian, or the like of the existence of the child in the vehicle, or perform a rescue request, thereby preventing the safety accident.

Additional aspects of the invention will be set forth in part in the description which follows and, in part, will be obvious from the description, or may be learned by practice of the invention.

In accordance with one aspect of the present invention, a vehicle control system includes: one or more image sensors disposed on a vehicle to have a field of view of an inside of the vehicle; and a controller connected to the image sensor to perform communication and configured to control the vehicle according to a state of a child existing in the vehicle, wherein the controller is configured to: recognize an occupant sensing area on the basis of image data generated by the image sensor; determine whether an occupant is the child on the basis of the occupant sensing area; determine whether the state of the child is a dangerous situation on the basis of at least one of an existence of the child alone in the vehicle for a predetermined reference time or more and a movement of the child in response to determining that the occupant is the child; and control the vehicle according to an indoor state of the vehicle in response to determining that the state of the child is a dangerous situation.

In accordance with another aspect of the present invention, a vehicle control method includes: sensing, by one or more image sensors disposed on a vehicle to have a field of view of an inside of the vehicle, sensing an inside of the vehicle; recognizing, by a controller, an occupant sensing area on the basis of image data generated by the image sensor; determining, by the controller, whether an occupant is the child on the basis of the occupant sensing area; determining, by the controller, whether the state of the child is a dangerous situation on the basis of at least one of an existence of the child alone in the vehicle for a predetermined reference time or more and a movement of the child in response to determining that the occupant is the child; and controlling, by the controller, the vehicle according to the determined dangerous situation.

BRIEF DESCRIPTION OF THE DRAWINGS

These and/or other aspects of the invention will become apparent and more readily appreciated from the following description of the embodiments, taken in conjunction with the accompanying drawings of which:

FIG. 9 is a flowchart showing a vehicle control method according to another embodiment of the present disclosure.

DETAILED DESCRIPTION

Hereinafter, the exemplary embodiment of the present disclosure will be described with reference to the accompanying drawings in detail. Although the terms "first," "second," "A," "B," "(a)", "(b)", etc. may be used to describe various components, the terms do not limit the corresponding components and the order or sequence thereof, but are used only for the purpose of distinguishing one component from another component. It will be understood that when an element is referred to as being "connected" or "coupled" to another element, it can be directly connected or coupled to the other element or intervening elements may be present.

A vehicle in the present disclosure may be concept that includes an automobile, a motorcycle, and the like. In addition, the vehicle may be a concept that includes an internal combustion engine vehicle having an engine as a power source, a hybrid vehicle having an engine and an electric motor as a power source, and an electric vehicle having an electric motor as a power source. The following description will be made in relation to an automobile as a vehicle.

In the following description, the front refers to a forward driving direction of the vehicle, and the rear refers to a backward driving direction of the vehicle. In addition, the left of the vehicle refers to the left side with respect to the forward driving direction of the vehicle, and the right of the vehicle refers to the right side with respect to the forward driving direction of the vehicle. In addition, the rear lateral side of the vehicle refers to the left side or the right side with respect to the backward driving direction of the vehicle.

Figure 1:
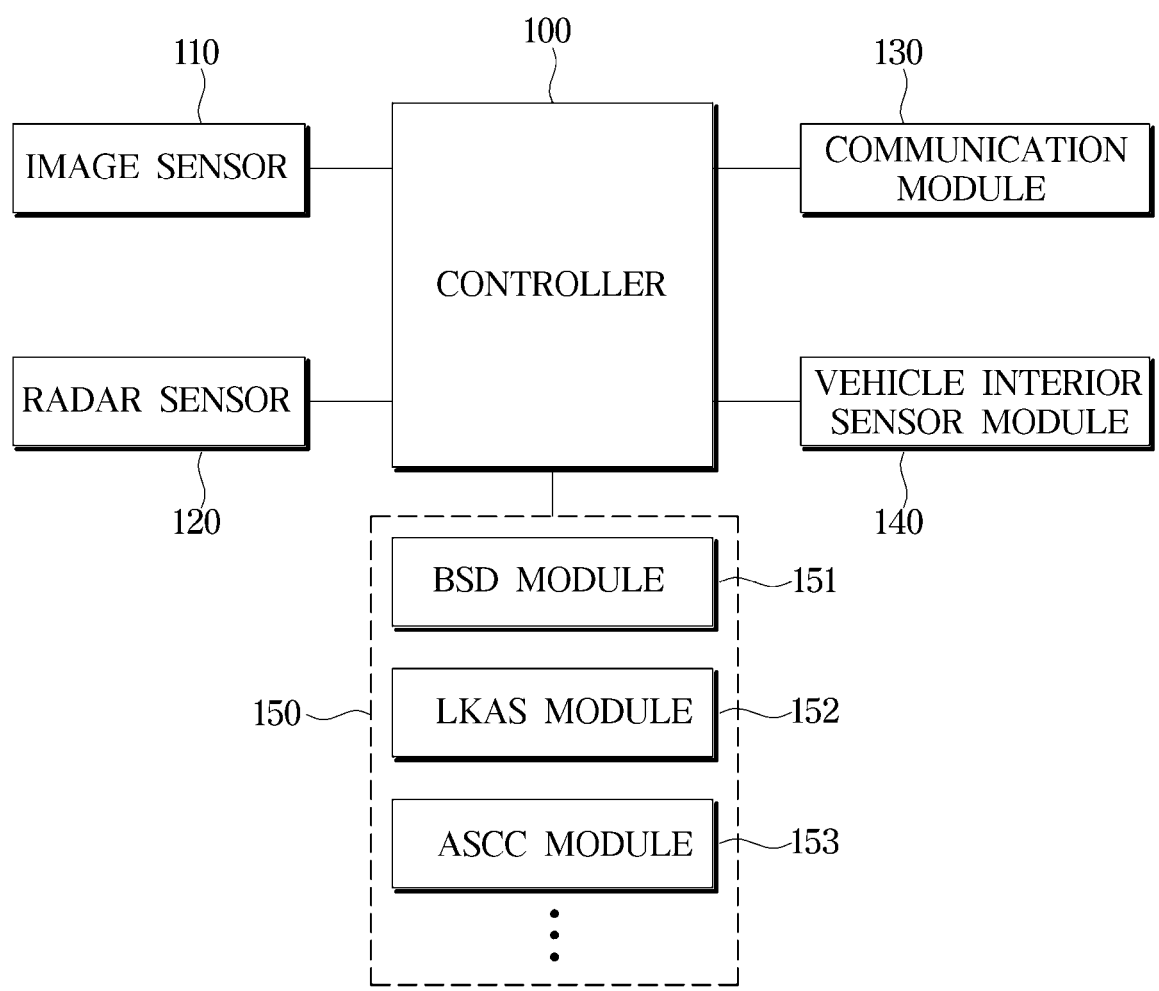
FIG. 1 is a block diagram illustrating a vehicle according to an embodiment of the present disclosure.

FIG. 1 is a block diagram illustrating a vehicle according to an embodiment of the present disclosure.

Referring to FIG. 1, a vehicle includes a controller 100, an image sensor 110, a radar sensor 120, a communication module 130, a vehicle interior sensor module 140, a driver assistance system module 150, and the like.

The image sensor 110 may refer to a device for converting light (image information) input through a camera lens into an electrical digital signal. For example, the image sensor 110 may refer to a charge coupled device (CCD) sensor that directly transmits a signal in the form of an electron. Alternatively, the image sensor 110 may refer to a complementary metal oxide semiconductor (CMOS) sensor that converts a signal into a voltage form and transmits the signal.

For example, the image sensor 110 may be configured to have a field of view of the inside or outside of the vehicle to capture image data, and process the captured image data.

The image sensor 110 may be disposed in the vehicle to have a field of view of the inside or the outside of the vehicle.

When the image sensor 110 is disposed to have a field of view of the inside of the vehicle, one or more image sensors 110 may be disposed inside the vehicle to have fields of view of a plurality of seats installed in the vehicle, respectively. In detail, the image sensor 110 may be disposed on a dashboard, a center fascia, a room mirror, an A pillar, or the like to have fields of view of a driver's seat and a passenger seat of the vehicle. However, the arrangement of the image sensor 110 is not limited thereto.

When the image sensor 110 is disposed to have a field of view of the outside of the vehicle, one or more image sensors 110 may be mounted on parts of the vehicle to have fields of view of the front, the side, or the rear of the vehicle, respectively.

Since image information photographed by the image sensor 110 is composed of image data, the image information may refer to image data captured by the image sensor 110. In the present disclosure, the image information photographed by the image sensor 110 refers to the image data captured by the image sensor 110. Image data captured by the image sensor 110 may be generated, for example, in one of raw AVI, MPEG-4, H.264, DivX, and JPEG.

Image data captured by the image sensor 110 may be processed by a processor. The processor may operate to process image data captured by the image sensor 110.

The processor may be implemented as hardware, using at least one of electrical unit capable of processing image data and performing other functions, for example, application specific integrated circuits (ASICs), digital signal processors (DSPs), digital signal processing devices (DSPDs), programmable logic devices (PLDs), field programmable gate arrays (FPGAs), controllers, microcontrollers, and microprocessors.

On the other hand, the radar sensor 120 refers to another sensor module except for the image sensor 110 configured to capture an image. For example, a plurality of the radar sensors 120 may be disposed in the vehicle to have a sensing area for the inside or outside of the vehicle to capture sensing data. The radar sensor 120 may not be provided, or may be provided in one or more units thereof.

The communication module 130 may perform a function of communicating with a mobile communication terminal, a communication center, a base station, or the like. In addition, the communication module 130 may perform a function of performing a vehicle-to-vehicle communication, a vehicle-to-infrastructure communication, a vehicle-to-server communication, and an in-vehicle communication. To this end, the communication module 130 may include a transmitting module and a receiving module. For example, the communication module 130 may include a broadcast receiving module, a wireless internet module, a short range communication module, a position information module, an optical communication module, a V2X communication module, and the like.

The broadcast receiving module receives a broadcast signal or broadcast related information from an external broadcast management server through a broadcast channel. Here, the broadcast includes at least one of radio broadcast and television (TV) broadcast.

The wireless internet module refers to a module for wireless internet access and may be embedded in or externally connected to a vehicle.

The short range communication module is provided for short range communication, and may support short range communication using at least one technology of Bluetooth™, Radio Frequency Identification (RFID), Infrared Data Association (IrDA), Ultra-Wideband (UWB), ZigBee, Near field communication (NFC), Wireless-Fidelity (Wi-Fi), Wi-Fi Direct, and Wireless Universal Serial Bus (Wireless USB).

The position information module is a module for acquiring position information of a vehicle, and a representative example of such a position information module is a Global Positioning System (GPS) module. For example, when the vehicle utilizes a GPS module, the vehicle may acquire the position of the vehicle using a signal transmitted from a GPS satellite. In some embodiments, the position information module may be a component included in the vehicle interior sensor module 140 rather than a component included in the communication module 130.

The optical communication module may include a light transmitter and a light receiver. The light transmitter and the light receiver may transmit and receive information by converting optical signals into electrical signals.

The V2X communication module is a module for performing wireless communication with a server or another vehicle, an infrastructure device, or the like. V2X communication according to the present disclosure represents allowing a vehicle to exchange information with an obstacle, such as another vehicle, a mobile device, a road, or the like through a wired/wireless network or a technology thereof. The V2X communication modules may include concepts of vehicle to vehicle (V2V) communication, vehicle to infrastructure (V2I) communication, vehicle to nomadic Device (V2N) communication, vehicle to mobile device communication, vehicle to pedestrian (V2P) communication, and the like. The V2X communication module operates on the basis of Dedicated Short-Range Communications (DSRC), and may employ Wireless Access in Vehicular Environment (WAVE), which was recently conducted by the Institute of Electrical and Electronics Engineers (IEEE), or IEEE 802.11p communication technology using a 5.9 GHz band. However, the implementation of the V2X communication module is not limited thereto, and it should be understood to include all types of inter-vehicle communications being developed now or to be developed in the future.

The mobile communication terminal according to the present disclosure may refer to a machine type communication (MTC) terminal or an Internet of Things (IoT) terminal, and the MTC terminal or IOT terminal may include a terminal supporting low cost (or low complexity) or a terminal supporting coverage enhancement.

In the present disclosure, an MTC terminal or an IoT terminal will be described as an MTC terminal, and the MTC terminal may refer to a terminal that supports low cost (or low complexity) and coverage enhancement. In the present disclosure, the MTC terminal may refer to a terminal defined into a specific category for supporting low cost (or low complexity) and/or coverage enhancement.

In other words, in the present disclosure, the MTC terminal may refer to a newly defined 3GPP Release-13 low cost (or low complexity) UE category/type for performing LTE-based MTC related operations. Alternatively, in the present disclosure, the MTC terminal may refer to a UE category/type defined in the existing 3GPP Release-12 or lower supporting an enhanced coverage compared to the existing LTE coverage, or a newly defined Release-13 low cost (or lower power consumption) UE category/type.

A wireless communication system according to the present disclosure may be widely used in order to provide a variety of communication services such as a voice service, a packet data service, and the like. The wireless communication system may include user equipment (UE) and a base station (BS or eNB). In the present description, the term "user equipment" or "UE" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

A base station or a cell may indicate a station that communicates with the user equipment. Such a base station may be referred to as different terms, for example, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like, and may be construed as an inclusive concept of a variety of coverage areas, such as a megacell, a macrocell, a microcell, a picocell, a femtocell, a relay node (RN), a remote radio head (RRH), a small cell communication area, and the like.

In a case of the above-listed various cells, there is a base station controlling each cell. Accordingly, the term "base station" may be construed as two meanings. The term "base station" may indicate (i) an apparatus itself providing a megacell, a macrocell, a microcell, a picocell, a femtocell, or a small cell in connection with a wireless region, or (ii) the wireless region itself. In the case (i), apparatuses providing a predetermined wireless region may be controlled by the same entity. Furthermore, all apparatuses which interact to configure the wireless region through cooperation may be indicated to as "the base station." According to a configuration scheme of a wireless region, one or more of eNB, RRH, an antenna, RU, a low power node (LPN), a point, a transmission/reception point, a transmission point, a reception point, or the like may be embodiments of the base station. In the case (ii), considering from the perspective of user equipment (UE) or the position of neighboring base stations, the wireless region itself receiving and/or transmitting signals may be referred to as a base station.

Accordingly, a megacell, a macrocell, a microcell, a picocell, a femtocell, a small cell, RRH, an antenna, RU, LPN, a point, eNB, a transmission/reception point, a transmission point, and a reception point may be inclusively referred to as "a base station."

In the present description, the user equipment and the base station may be two types of transmission/reception subjects, having an inclusive meaning, which are used to embody the technology and the technical concept disclosed herein, and may not be limited to a specific term or word. Furthermore, the user equipment and the base station may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to the base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used.

In a LTE or LTE-A system in conformance with a corresponding standard, an uplink and/or a downlink may be constituted on the basis of one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), enhanced physical downlink control channel (EPDCCH), and/or the like. Data may be transmitted through such data channels as a physical downlink shared channel (PDSCH), a physical uplink shared channel (PUSCH), and/or the like.

Meanwhile, control information may be transmitted through 'enhanced PDCCH' or 'extended PDCCH' (EPDCCH).

In the present description, the term "cell" may indicate one of coverage of a signal transmitted from a transmission point or transmission/reception point, a component carrier having the coverage, and the transmission/reception point.

A wireless communication system to which at least one embodiment may be applied may be one of a coordinated multi-point transmission/reception (CoMP) system, a coordinated multi-antenna transmission system, and a coordinated multi-cell communication system. Herein, the CoMP system may include at least two multiple transmission/reception points and user equipment (UE).

Multiple transmission/reception points may include eNB and at least one RRH. Herein, the eNB may be a base station or a macrocell. The RRH may be wiredly controlled by coupling to the eNB through an optical cable or an optical fiber. Furthermore, the RRH may have a low transmission power within a macrocell region.

Hereinafter, a downlink (DL) may represent communication or a communication path from multiple transmission/reception points to user equipment. An uplink (UL) may represent communication or a communication path from the user equipment to the multiple transmission/reception points. In the downlink, a transmitter may be a portion of the multiple transmission/reception points, and a receiver may be a portion of the user equipment. In the uplink, a transmitter may be a portion of the user equipment, and a receiver may be a portion of the multiple transmission/reception points.

Hereinafter, a situation in which a signal is transmitted or received through such channels as PUCCH, PUSCH, PDCCH, EPDCCH, and/or PDSCH may be referred to by the expression "transmit or receive PUCCH, PUSCH, PDCCH, EPDCCH, and/or PDSCH."

In addition, hereinafter, an expression of transmitting or receiving a PDCCH or transmitting or receiving a signal through the PDCCH may be used as a meaning including transmitting or receiving an EPDCCH or transmitting or receiving a signal through the EPDCCH.

That is, the physical downlink control channel described below may refer to PDCCH or EPDCCH, and may also be used to refer to meaning including both PDCCH and EPDCCH.

In addition, for convenience of description, an EPDCCH according to an embodiment of the present disclosure may be applied to a part described in relation to a PDCCH, and a PDCCH according to an embodiment may be applied to a part described in relation to an EPDCCH.

Meanwhile, high layer signaling described below includes radio resource control (RRC) signaling for transmitting RRC information including an RRC parameter. Hereinafter, transmission and reception of a signal through a channel may be referred to by the expression "transmission and reception of the corresponding channel".

The vehicle interior sensor module 140 refers to a sensor for sensing vehicle interior information. For example, the vehicle interior sensor module 140 may refer to a torque sensor for sensing steering torque, a steering angle sensor for sensing a steering angle, a motor position sensor for sensing information about a steering motor, a vehicle speed sensor, and a vehicle motion detection sensor for sensing a motion of a vehicle, a vehicle posture detection sensor, and the like.

In addition, the vehicle interior sensor module 140 may further include a sensor for sensing an environment of inside of the vehicle. For example, the vehicle interior sensor module 140 may include a temperature sensor that senses an indoor temperature of the vehicle, an oxygen concentration sensor that senses an oxygen concentration inside the vehicle, and the like. In addition, the vehicle interior sensor module 140 may refer to a sensor for sensing various types of data of an inside of the vehicle, and may include one or more sensors.

The controller 100 acquires data from at least one of the image sensor 110, the radar sensor 120, the communication module 130, and the vehicle interior sensor module 140, and controls various operations of the vehicle on the basis of the acquired data. Alternatively, the controller 100 may acquire image data from the image sensor 110 and process the image data. In addition, the controller 100 may receive sensing data from the radar sensor 120 and process the sensing data. Alternatively, the controller 100 may acquire data from the vehicle interior sensor module 140 or the communication module 130 and process the acquired data. For this, the controller 100 may include at least one processor.

The vehicle control system according to the present disclosure may be implemented by combining the above described components as required. For example, the vehicle control system may include an image sensor 110, a radar sensor 120, and a controller 100. For another example, the vehicle control system may include an image sensor 110 and a controller 100. However, the implementation of the vehicle control system is not limited thereto.

In detail, the vehicle control system may include one or more image sensors 110 disposed on a vehicle to have a field of view of an inside or outside of the vehicle and configured to capture image data and process the captured image data and a controller configured to control the vehicle according to the state of a child existing in the vehicle on the basis of at least part of processing of the image data.

The controller 100 is configured to determine whether an occupant is a child on the basis of an occupant sensing area acquired by a result of the processing of the image data, determine whether the state of the child is a dangerous situation on the basis of an existence of the child alone in the vehicle for a predetermined reference time or more, a movement of the child, and the like, and control, in response to determining that the state of the child is a dangerous situation, the vehicle according to an indoor state of the vehicle.

Here, a basic sensing area may refer to two-dimensional image information acquired from the processing result of the image data. Accordingly, the occupant, seat, and other sensed surrounding objects may be displayed in the basic sensing area. The basic sensing area may refer to an image captured by the camera.

Here, an occupant sensing area may refer to a predetermined sensing area that is set around an image corresponding to an occupant in the basic sensing area to detect the occupant. The occupant sensing area may be set by a region of interests (ROI) technique, and the like, but the implementation of the occupant sensing area is not limited thereto.

An embodiment in which the controller 100 determines that the detected occupant is a child will be described below with reference to FIGS. 4 and 5, and an embodiment in which the controller 100 determines that the state of a child is a dangerous situation will be described below with reference to FIGS. 6 and 7.

In addition, the controller 100 may control the operation of at least one of the image sensor 110, the radar sensor 120, the communication module 130, and the vehicle interior sensor module 140. In addition, the controller 100 may control operations of various driver assistance systems (DASs) configured in the vehicle.

The controller 100 may operate to control one or more of the driver assistance systems used in the vehicle. For example, the controller 100 may determine a specific situation, condition, event occurrence, performance of a control operation, or the like on the basis of data acquired from at least one of the above-described components 110, 120, 130, and 140.

The controller 100 may transmit a signal for controlling the operation of various driver assistance system modules 150 configured in the vehicle using the determined information. For example, the driver assistance system modules 150 may include a blind spot detection (BSD) system module 151, a lane keeping assistance system (LKAS) module 152, a smart cruise control (SCC) system module 153, and the like.

In addition, the driver assistance system modules 150 configured in the vehicle may further include various types of driver assistance systems, such as a lane departure warning system (LDWS), a lane change assistance system (LCAS), a parking assistance system (PAS), and the like. The terms and names of the driver assistance system described herein should be construed as being illustrative rather than being limited by the terms and names. In addition, the driver assistance system modules 150 may include an autonomous driving module for autonomous driving. Alternatively, the controller 100 may control the vehicle to perform autonomous driving through control of individual system modules included in the driver assistance system modules 150.

Figure 2:
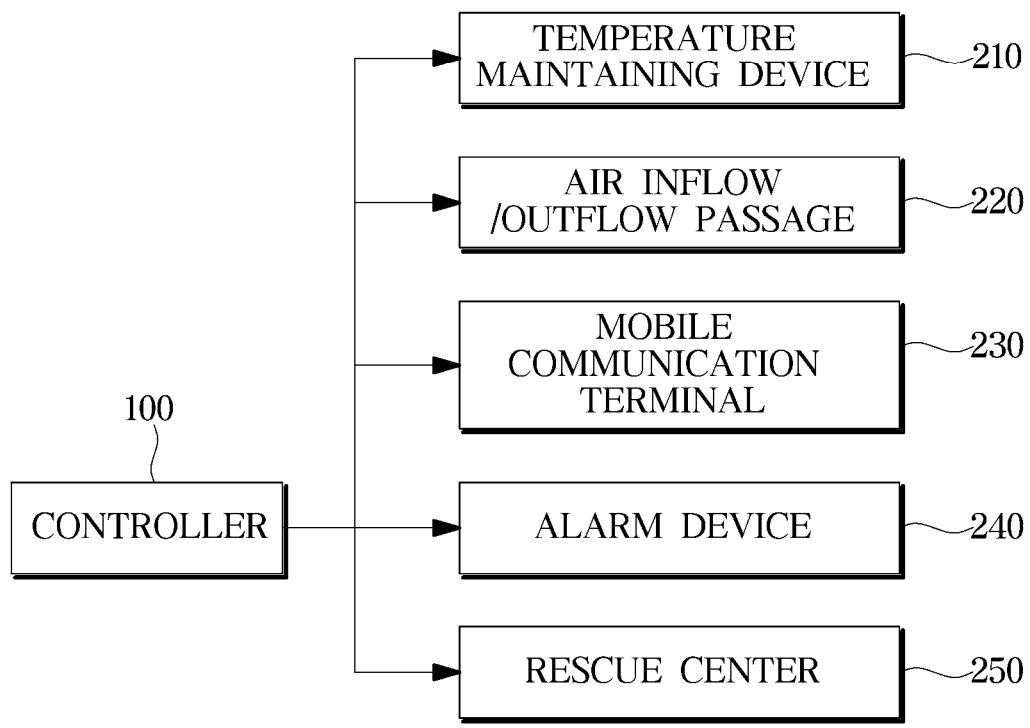
FIG. 2 is a block diagram illustrating an embodiment in which a vehicle is controlled according to the present disclosure.

FIG. 2 is a block diagram illustrating an embodiment in which a vehicle is controlled according to the present disclosure.

Referring to FIGS. 1 and 2, the controller 100 may determine whether the detected occupant is a child, determine whether the state of the child is a dangerous situation, and perform control of a vehicle in response to the dangerous situation.

For example, when the indoor temperature in the vehicle becomes very high or very low, the controller 100 may generate a control signal for driving a temperature maintaining device 210 disposed in the vehicle to adjust the condition of the child or prevent the occurrence of disease, and output the generated control signal to the temperature maintaining device 210.

Here, the temperature maintaining device 210 may include an air conditioner, a heater, an air purifier, and the like.

In detail, when the vehicle control system further includes a temperature sensor for sensing the indoor temperature of the vehicle, the controller 100, in response to determining the state of the child to be a dangerous situation, may control the vehicle by generating a control signal for driving the air conditioner disposed in the vehicle and outputting the generated control signal to the air conditioner when the indoor temperature sensed by the temperature sensor is higher than or equal to a previously set first reference temperature, and control the vehicle by generating a control signal for driving the heater disposed in the vehicle and outputting the generated control signal to the heater when the indoor temperature sensed by the temperature sensor is lower than or equal to a previously set second reference temperature.

Here, the first reference temperature may refer to a threshold temperature from which children are generally hard to endure the high temperature or at which diseases are most frequently found in children. For example, the first reference temperature may be about 30 degrees, but is not limited thereto.

On the other hand, the second reference temperature may refer to a threshold temperature from which children are generally hard to endure the low temperature or at which diseases are most frequently found in children. For example, the second reference temperature may be about 4 degrees, but is not limited thereto.

The first reference temperature and the second reference temperature may be determined by the experiment, design, or the like. In addition, the first reference temperature and the second reference temperature may vary depending on the season, the external temperature of the vehicle, the thermal characteristics of the vehicle, and the like.

Here, the thermal characteristic may refer to a rate of change of temperature per unit time, and may be determined by a material of a seat included in the vehicle, a frame forming the vehicle, and a size of the vehicle.

On the other hand, when an air inflow/outflow passage 220 is closed, such as a window or a sunroof in the vehicle, and thus the oxygen concentration in the vehicle decreases, the controller 100 may generate a control signal for opening the air inflow/outflow passage 220 disposed in the vehicle to protect the child, and output the generated control signal to an actuator for opening the air inflow/outflow passage 220.

In detail, when the vehicle control system further includes an oxygen concentration sensor for sensing the oxygen concentration of the inside of the vehicle, the controller 100, in response to determining the state of the child to be a dangerous situation, may control the vehicle by generating a control signal for opening at least one of the window and the sunroof of the vehicle and outputting the generated control signal to the actuator for opening the air inflow/outflow passage 220 when the oxygen concentration sensed by the oxygen concentration sensor is lower than or equal to a previously set reference concentration.

Here, the reference concentration may preferably be about 18%. However, the reference concentration is not limited thereto, and as described above, may be adjusted depending on the difference between each of an occupant sensing area 420, a head sensing area 510, a torso sensing area 520, and the like and a previously set reference value as described above.

On the other hand, a child in the vehicle may exist alone for a certain time or more. In this case, the controller 100 may generate and output at least one of a notification signal for notifying a guardian of the existence of the child alone for a certain time of more in the vehicle and an alarm signal for generating an alarm operation in the vehicle when the child in the vehicle exists for a previously set reference time or more.

As one example, the controller 100, when a child in a vehicle 300 exists for a previously set reference time or more, may generate a notification signal for notifying a guardian of the existence of the child and an ID signal for specifying the vehicle 300 and output the generated notification signal and the ID signal to the communication module 130 and transmit the notification signal to a mobile communication terminal 230 of the guardian through the communication module 130.

At this time, the notification signal and ID signal are transmitted (uplink) to the base station via the control channel and the data channel, the notification signal and ID signal transmitted to the base station are transmitted to the mobile communication terminal 230 of the guardian via the control channel and data channel (downlink).

Here, the guardian may represent a driver, a youth, an adult passenger, or a third party.

Here, the mobile communication terminal 230 includes, for example, a smart phone, a smart key, and the like. However, the implementation of the mobile communication terminal 230 is not limited thereto and may include any terminal that can perform wireless communication.

As another example, the controller 100, when a child in a vehicle exists for a previously set reference time or more, may generate an alarm signal for generating an alarm operation, such as burglar alarm, in the vehicle, and output the generated alarm signal to an alarm device 240. The alarm device 240 operates to receive the alarm signal and perform an alarm operation, but the implementation of the alarm device is not limited thereto.

The reference time described above may be preferably set to 5 minutes, but is not limited thereto.

On the other hand, even when the controller 100 adjusts the internal temperature or oxygen concentration, the state of the child may deteriorate. In this case, the controller 100 may generate and output a rescue signal for requesting a rescue from a rescue center 250, such as a 119 rescue center, a hospital, an emergency rescue center, or the like.

That is, the controller 100, in response to determining the state of the child to be a dangerous situation, may generate a rescue signal for requesting a rescue from the rescue center 250 and output the generated rescue signal to the communication module 130. In detail, the controller 100 generates a rescue signal and outputs the generated rescue signal to the communication module 130, and the rescue signal is uplink-transmitted to the base station through the communication module 130, and the base station downlink-transmits the rescue signal received from the communication module 13 to the rescue center 250.

When a child exists alone in the vehicle, there is a need to send a mobile communication terminal possessed by a driver, a guardian, and the like with a notification signal for notifying the driver, the guardian, and the like of the situation that the child exists alone in the vehicle.

That is, the controller 100, in response to determining the state of the child to be a dangerous situation, may generate a notification signal for providing the mobile communication terminal 230 with image data including an image of the child, and output the generated notification signal to the communication module 130. In detail, the controller 100 generates a notification signal and outputs the notification signal to the communication module 130, and the notification signal is uplink-transmitted to the base station through the communication module 130, and the base station downlink-transmits the notification signal received from the communication module 130 to the mobile communication terminal 230 of the guardian.

As described above, in order for the controller 100 to control the vehicle, there is a need to identify the state of a child in the vehicle, and also determine whether the child exists alone in the vehicle.

Hereinafter, for the determination of the existence of a child alone, the image sensor 110 and the position of the image sensor 110 according to the present disclosure will be described.

Meanwhile, the disclosed embodiments may be implemented as a software S/W program including instructions stored in a computer-readable storage media.

The computer may be provided as an apparatus capable of calling stored instructions from a storage medium and allowing operations of the disclosed embodiments to be performable according to the called instructions.

The computer readable storage medium may be provided in the form of a non-transitory storage medium. Here, when a storage medium is referred to as 'non-transitory', it can be understood that the storage medium does not include a signal and is tangible, rather than data is semi-permanently or temporarily stored in the storage medium.

Figure 3:
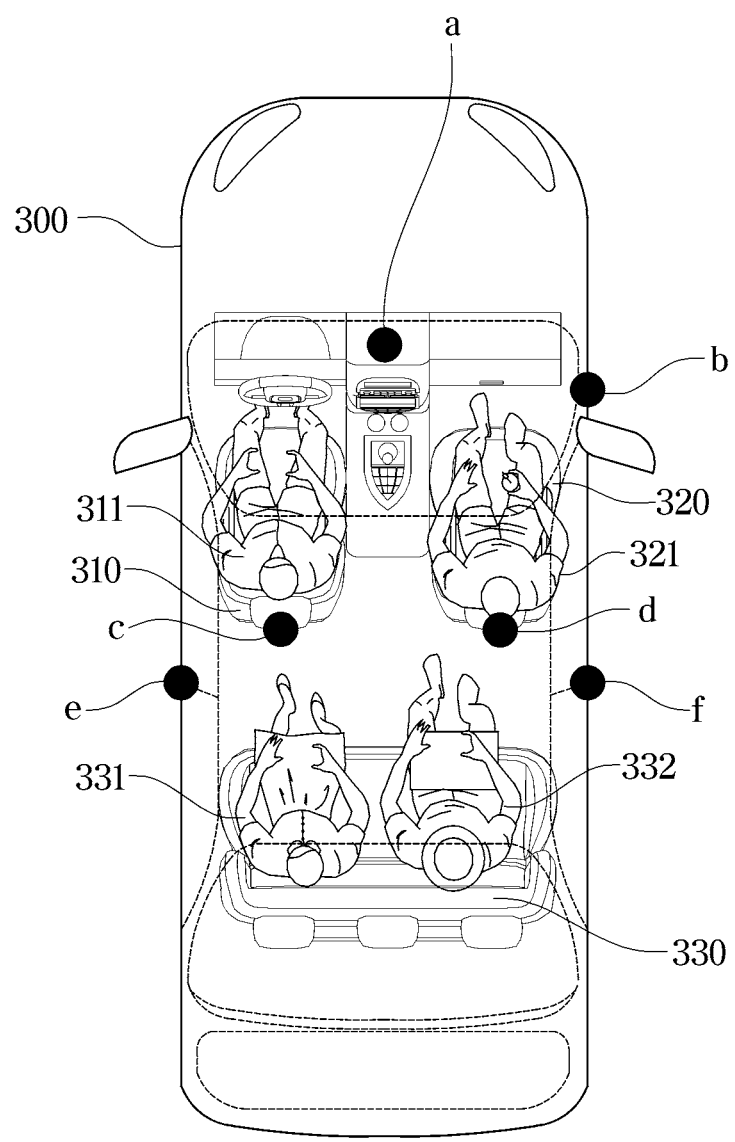
FIG. 3 is a view illustrating the positions of image sensors according to the present disclosure.

FIG. 3 is a view illustrating the positions of image sensors according to the present disclosure.

Referring to FIG. 3, a plurality of image sensors 110 may be disposed at appropriate positions to detect all seats installed in the vehicle 300. In this case, the seat may include a driver's seat 310, a passenger seat 320, an occupant seat 330, and the like. In this case, the occupant seat 330 may be additionally installed according to the type of vehicle.

That is, the one or more image sensors 110 may be disposed to have a field of view for each of the plurality of seats installed in the vehicle 300 to capture a plurality of pieces of image data.

As one example, in order for the image sensor 110 to sense a driver 311 in the driver's seat 310 and an occupant in the passenger seat 320 inside the vehicle 300, the image sensors 110 may be disposed on a position-a corresponding to the position of the room mirror, dashboard, or the like, and a position-b corresponding to the position of a A-pillar installed in front of the passenger seat 320. However, the position of the image sensor is not limited thereto.

As another example, in order for sense an occupant in the occupant seat 330 installed behind the driver's seat 310 and the passenger seat 320 inside the vehicle 300, the image sensors 110 may be disposed on a position-c corresponding to the rear side of the driver's seat 310, a position-d corresponding to the rear side of the passenger seat 320, and a position-e and a position-f corresponding to the positions of B pillars. However, the position of the image sensor is not limited thereto.

In this case, the controller 100 may determine whether the child exists alone in the vehicle 300 on the basis of the processing result of each of the plurality of pieces of image data.

For example, the controller 100, on the basis of a processing result of first image data captured by the image sensors 110 disposed on the position-a and the position-b, determines whether the driver 311 has left the vehicle 300, determines whether a first occupant 321 in the passenger seat 320 is a child, and in response to determining that the first occupant 321 in the passenger seat 320 is not a child, determines whether the first occupant 321 has left the vehicle 300.

Similarly, the controller 100, on the basis of a processing result of second image data captured by the image sensors 110 disposed on the position-c and the position-d (or the position-f), determines whether a second occupant 331 and a third occupant 332 are a child and in response to determining that at least one of the second occupant 331 and the third occupant 332 is not a child, determines whether the at least one of the second occupant 331 and the third occupant 332 has left the vehicle 300.

In other words, the controller 100, in response to determining that the driver 311 and any occupant who is not a child have left the vehicle, and only an occupant determined to be a child among all the occupants except for the driver 311 exists alone in the vehicle 300, determines that only a child exists in the vehicle 300.

Hereinafter, an embodiment in which the controller 100 according to the present disclosure determines a child will be described in detail.

Figure 4:
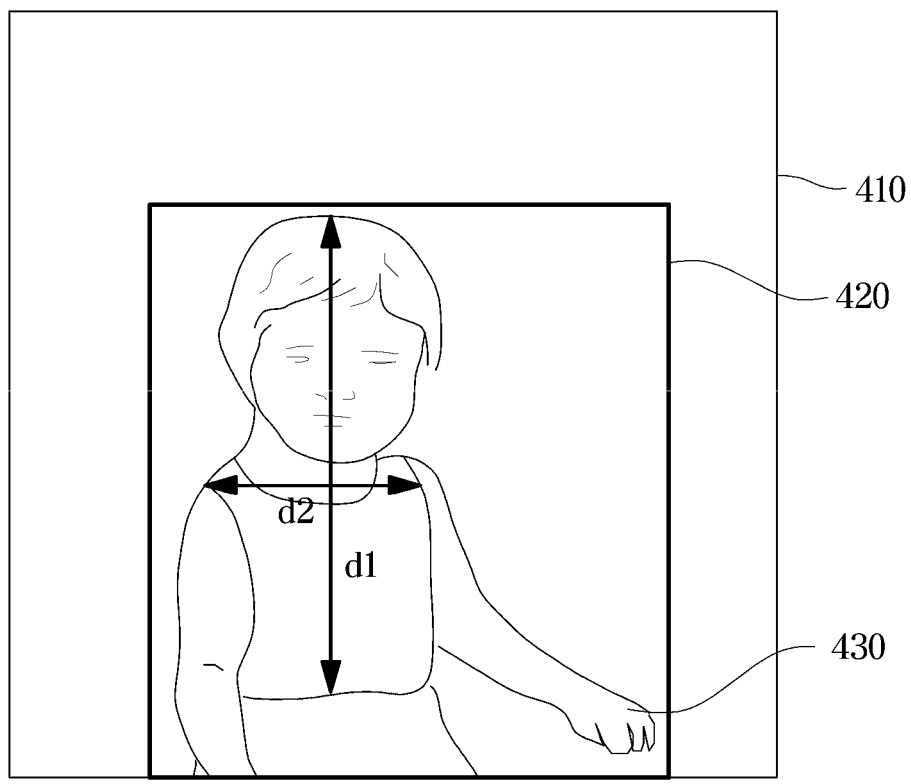
FIG. 4 is a view for describing a first embodiment in which a child is determined according to the present disclosure.

FIG. 4 is a view for describing a first embodiment in which a child is determined according to the present disclosure.

Referring to FIG. 4, a child existing in the vehicle 300 may be determined using the size of the occupant sensing area 420 included in the basic sensing area 410, the size of the upper body of an occupant 430, or the like. Here, the upper body of the occupant 430 may refer to a body part occupying from the head to the torso of the occupant 430.

Generally, the occupant sensing area 420 includes not only the upper part of the occupant 430 but also other objects, a background, and the like, but generally is set to include the upper body of the occupant 430. Accordingly, the controller 100 may roughly estimate the size of the upper body of the occupant 430 from the area of the sensing area 420.

As one example, the controller 100 may determine that the occupant 430 is a child when at least one of an upper body size of the occupant 430 estimated by calculating the area of the occupant sensing area 420 and an upper body length d1 of the occupant 430 extracted from the occupant sensing area 420 is less than or equal to a previously set reference value.

According to one aspect, specifically, the controller 100 calculates the area of the entire occupant sensing area 420 that is distinguished from the basic sensing area 410. Thereafter, the controller 100 roughly estimates an upper body size of the occupant 430 on the basis of the calculated entire area of the occupant sensing area 420. When the estimated upper body size of the occupant 430 is less than or equal to a first reference value, the controller 100 determines that the occupant 430 included in the image data is a child.

According to another aspect, specifically, the controller 100 extracts an upper body length d1 of the occupant 430 in the occupant sensing area 420 that is distinguished from the basic sensing area 410. The controller 100 determines that the occupant 430 included in the image data is a child when the extracted upper body length d1 of the occupant 430 is less than or equal to a second reference value.

Here, the reference value is a value corresponding to a target of comparison, and the first reference value may be used for the upper body size of the occupant 430, and the second reference value may be used for the upper body length of the occupant 430.

Preferably, the first reference value may be 3600 $cm^2$, which is a square of 60 cm, and the second reference value may be 60 cm. However, the reference values are not limited thereto.

As another example, the controller 100 may determine that the occupant 430 is a child when the ratio of an area occupied by the occupant sensing area 420 in the basic sensing area 410, that is, an image, is less than or equal to a previously set reference ratio.

According to one aspect, specifically, the controller 100 calculates the size of the base sensing area 410 and the size of the occupant sensing area 420 and compares the ratio of the size of the occupant sensing area 420 to the size of the base sensing area 410. Thereafter, the controller 100 determines that the occupant 430 is a child when the calculated ratio is less than or equal to the reference ratio.

According to another aspect, specifically, the controller 100 may calculate the ratio of an area occupied by the occupant sensing area 420 in the basic sensing area 410 using image processing algorithm with respect to image data, that is, a two-dimensional (2D) image. As a result, the controller 100 compares the calculated ratio with the reference ratio, and when the ratio is less than or equal to the reference ratio, the controller 100 determines that the occupant 430 is a child.

On the other hand, since children have upper body length and shoulder development that are meager compared to adults, the controller 100 may easily determine a child only through a determination index corresponding to a parameter using the two variables.

As one example, the controller 100 may extract an upper body length d1 corresponding to the upper body of the occupant 430 and an shoulder length d2 corresponding to the shoulder of the occupant 430 from the occupant sensing area 420, generates a determination index on which the upper body length d1 and the should length d2 are reflected, and determines that the occupant 430 is a child when the determination index is less than or equal to a previously set determination index.

In detail, the controller 100 extracts an upper body length d1 and a shoulder length d2 of the occupant 430 from the occupant sensing area 420, and multiplies the upper body length d1 by the shoulder length d2 to generate a determination index. Thereafter, the controller 100 compares the generated determination index with a reference determination index, and when the generated determination index is less than or equal to the reference determination index, determines that the occupant 430 is a child.

Here, the reference determination index may be preferably 1800 cm 2 obtained by multiplying the upper body length of 60 cm by the should length of 30 cm, or may be 1800 without a length unit. However, the reference determination index is not limited thereto.

The shapes of the basic sensing area 410 and the occupant sensing area 420 described above are merely illustrative for the purpose of understanding the present disclosure, and are not limited to those illustrated in FIG. 4.

On the other hand, it is known that, as for children, generally, the ratio of the head to the full body is 1/4, the ratio of the leg to the full body is 1/4, and the ratio of the torso to the full body is 1/2, and as for adults, generally, the ratio of the head to the full body is 1/7, the ratio of the leg to the full body is 1/3, and the ratio of the torso to the full body is 1/2.

Accordingly, the controller 100 according to the present disclosure may separately recognize the face, the torso, or the full body of a child included in an image, and may determine whether the occupant 430 is a child using the ratio of the head to the torso body or the ratio of the head to the full body.

Hereinafter, an embodiment in which a child is determined using the ratio of the head to the torso or the ratio of the head to the full body will be described in detail.

Figure 5:
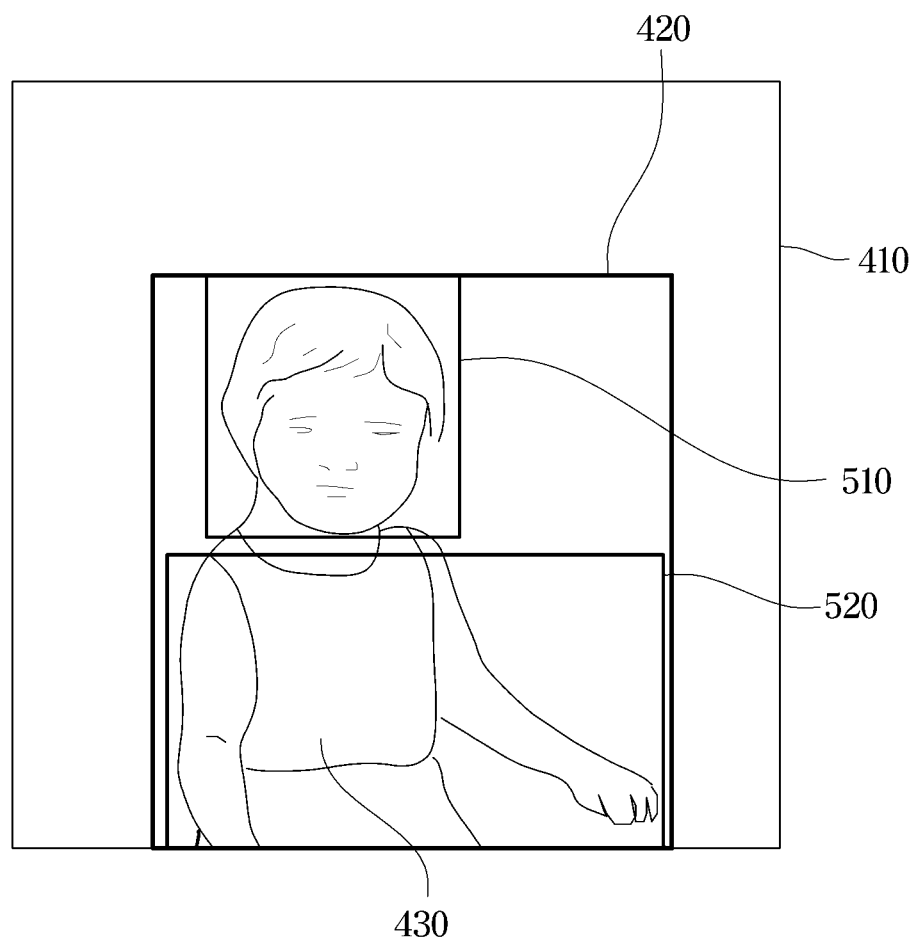
FIG. 5 is a view for describing a second embodiment in which a child is determined according to the present disclosure.

FIG. 5 is a view for describing a second embodiment in which a child is determined according to the present disclosure.

Referring to FIG. 5, a child existing in the vehicle 300 may be determined using a body part of the occupant 430 identified from the occupant sensing area 420.

In detail, the controller 100 distinguishes and detects a head sensing area corresponding to the head of the occupant 430 and a torso sensing area 520 corresponding to the torso of the occupant 430 in the occupant sensing area 420.

Thereafter, the controller 100 may calculate the ratio of the head sensing area 510 to the torso sensing area 520, and compare the calculated ratio with a previously set reference ratio.

Here, the reference ratio may refer to a ratio in which the size of the torso of the child is the denominator and the size of the head of the child is a molecule with respect to the upper body of the child. The reference ratio may be determined and set in advance by the design, experimental value, or the like. Preferably, the head sensing area 510 may be a typical square area having a length and a width of 15 cm, with respect to a child or may be an atypical area that satisfies a length of 15 cm with respect to the face of a child, and the torso sensing area 520 may be a typical rectangle area having a width of 30 cm and a length of 60 cm with respect to a child, or an atypical area that satisfies a length of 60 cm with respect to the face of a child. However, the reference ratio is not limited thereto.

The controller 100 may determine that the occupant 430 is a child when the ratio of the head sensing area 510 to the torso sensing area 520 is greater than or equal to a previously set first reference ratio.

This is because, as for children, the torso grows less than the head, and thus the ratio of the head to the torso is calculated to be relatively large. Accordingly, the above-described first reference ratio may be determined as the ratio of the head to the torso of average children. Preferably, the reference ratio may be determined to be 1/3, but is not limited thereto.

The shapes of the basic sensing area 410, the occupant sensing area 420, the head sensing area 510, and the torso sensing area 520 described above are illustrated to aid in the understanding of the present disclosure and are not limited to FIG. 5.

Although not shown, the full body of the child may be detected by the image sensor 110 according to the arrangement position of the image sensor 110. In this case, the controller 100 may distinguish the head sensing area 510 corresponding to the head of the occupant 430 from a full body sensing area corresponding to the full body of the occupant in the occupant detecting area 420, and when the ratio of the head sensing area 510 to the full body sensing area is greater than or equal to a previously set second reference ratio, determine that the occupant is a child.

Here, the second reference ratio may be set to be smaller than the above-described first reference ratio, preferably 1/4 of the first reference ratio. However, the second reference ratio is not limited thereto.

Hereinafter, an embodiment in which the state of a child is a dangerous situation according to the present disclosure will be described in detail.

Figure 6:
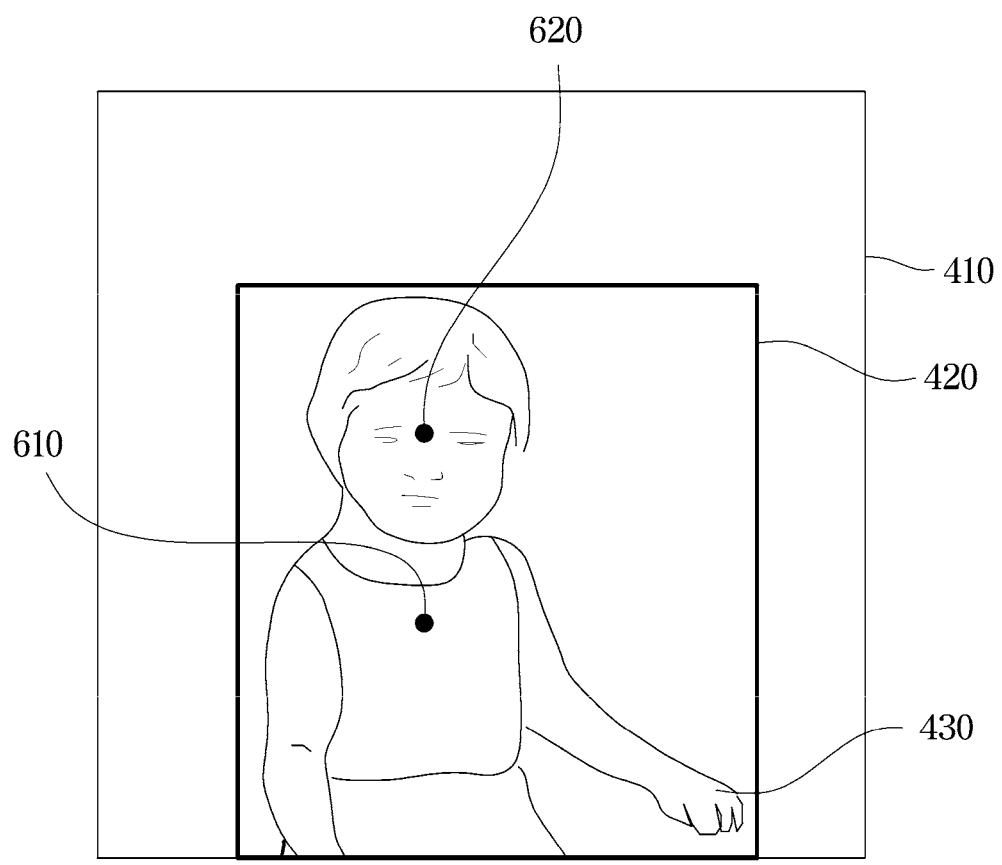
FIG. 6 is a view for describing a first embodiment in which the state of a child is a dangerous situation according to the present disclosure.

FIG. 6 is a view for describing a first embodiment in which the state of a child is a dangerous situation according to the present disclosure.

Referring to FIG. 6, the controller 100 may determine whether the state of a child corresponds to a dangerous situation using the movement of the child, that is, the amount of the child moved per unit time.

As one example, the controller 100 generates at least one of a torso central point 610 of the torso of the occupant 430 and a head central point 620 of the head of the occupant 430 in the occupant sensing area 420, calculates the amount of the generated central point moved per unit time to identify the movement of the occupant 430, and when the amount of the central point moved per unit time is less than or equal to a previously set reference movement amount, determines that the state of the child is a dangerous situation.

In detail, the controller 100 extracts the torso central point 610 of the torso of the occupant 430 and the head center point 620 of the head of the occupant 430 included in the occupant sensing area 420 using an image processing technique, and calculates the amounts of the torso central point 610 and the head central point 620 moved per unit time while continuously tracking the torso central point 610 and the head central point 620. Thereafter, the controller 100 determines that the state of the child is a dangerous situation when the amounts of the torso central point 610 and the head central point 620 moved per unit time are less than or equal to the reference movement amount.

Here, the reference movement amount may be preferably 0.03 ms, but is not limited thereto, and may vary according to the physical condition of the child. That is, as the occupant sensing area 420, the head sensing area 510, the torso sensing area 520, and the like becomes close to the previously set reference values, the reference movement amount increases to be greater than 0.03 ms, and as the occupant sensing area 420, the head sensing area 510, the torso sensing area 520, and the like becomes distant from the previously set reference values, the reference movement amount decreases to be smaller than 0.03 ms.

Here, the torso central point 610 of the torso refers to a central point detected with respect to the upper body of the occupant 430, and the head central point 620 of the head refers to a central point detected with respect to the head of the occupant 430. In particular, since the head central point 620 is detected obtained with respect to the head of the occupant 430, the head central point 620 may be detected only after the extraction of the head sensing area 510 shown in FIG. 5.

Referring to FIGS. 5 and 6, the controller 100 may generate the torso central point 610 with respect to the upper body of the occupant 430 in the occupant sensing area 420, and detect the head central point 620 with respect to the generated head sensing area 510 generated from the occupant sensing area 420.

The shapes of basic sensing area 410, the occupant sensing area 420, the head sensing area 510, and the torso sensing area 520 described above are merely illustrative for the purpose of understanding the present disclosure, and are not limited to those illustrated in FIG. 6.

Figure 7A:
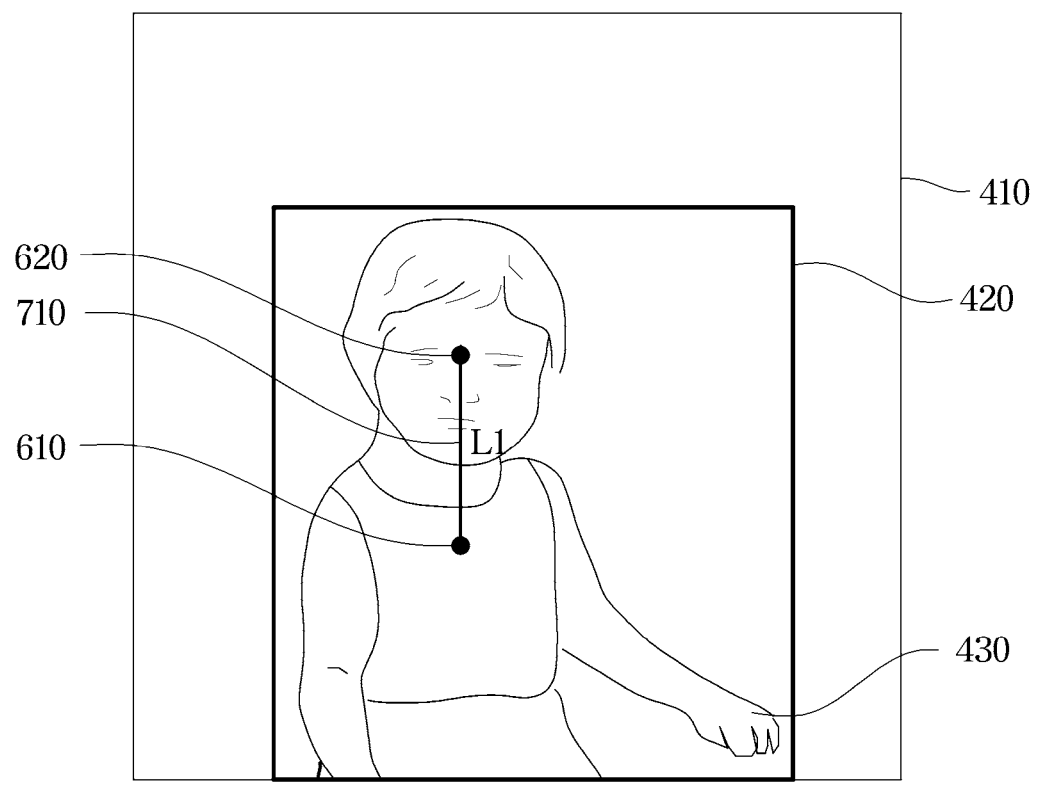
FIGS. 7A and 7B are views for describing a second embodiment in which the state of a child is a dangerous situation according to the present disclosure.
Figure 7B:
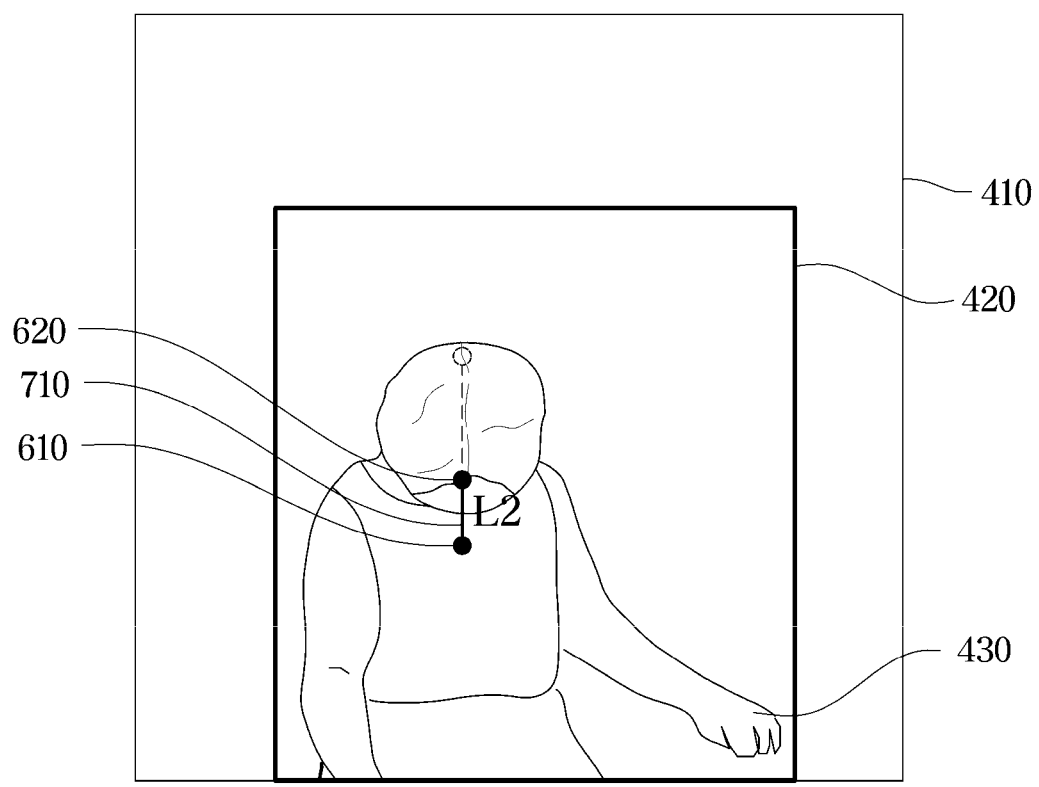

FIGS. 7A and 7B are views for describing a second embodiment in which the state of a child is a dangerous situation according to the present disclosure.

Referring to FIG. 7A, the controller 100 may determine whether the state of the child is a dangerous situation by setting a connecting line 710 connecting the torso central point 610 to the head central point 620 of the occupant 430, and comparing a characteristic of the set connecting line 710 with a normal model.

Here, the normal model may refer to a model that is trained with respect to a general boarding posture of the occupant 430 and is stored. In detail, the normal model may refer to various sitting postures of the occupant 430 in the normal condition, which are learned through machine learning and stored.

Referring to FIG. 7B, in an abnormal state, for example, an unconscious state of the occupant 430, the head of the occupant 430 may fall down, and thus the movement trajectory or shape of the connecting line 710 shown in FIG. 7A may be abnormally changed as shown in FIG. 7B. In other words, a first length 11 of the connecting line 710 shown in FIG. 7A may be abnormally changed to a second length 12 of the connecting line 710 as shown in FIG. 7B. Accordingly, the controller 100 may determine whether the state of the child is a dangerous situation by comparing the connecting line 710 with the normal model.

For example, the controller 100 may set the connecting line 710 connecting the torso central point 610 of the torso to the head central point 620 of the head, compare the characteristic of the connecting line 710, which includes at least one of a movement trajectory, a size, and a shape of the connecting line 710, with the previously stored normal model, and when the characteristic of the connecting line 710 does not match the normal model, determines that that state of the child is a dangerous situation.

Hereinafter, a method of controlling a vehicle capable of performing the present disclosure will be described in detail.

Figure 8:
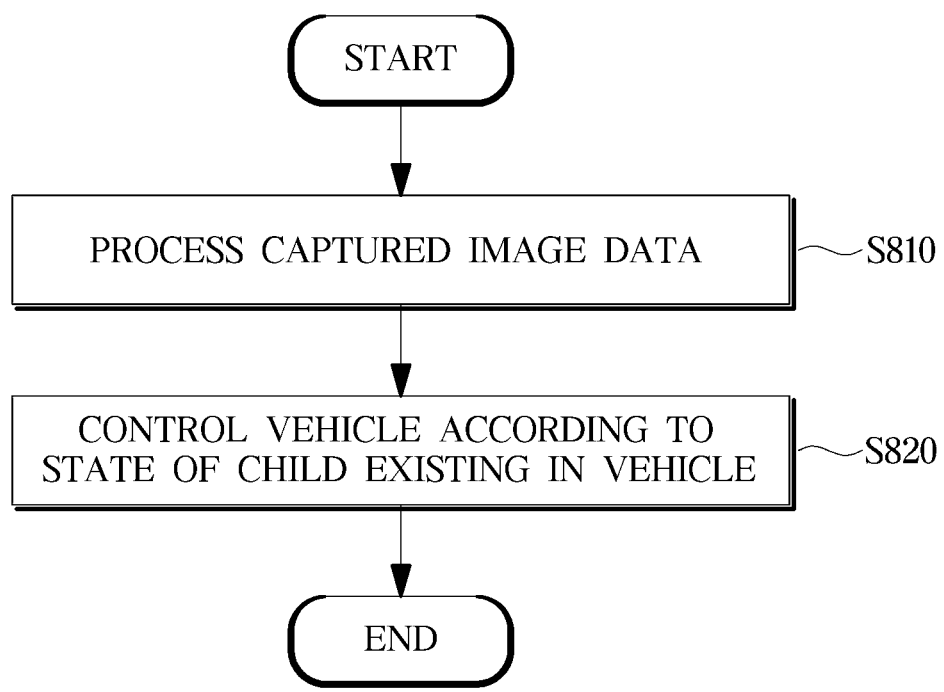
FIG. 8 is a flowchart showing a vehicle control method according to an embodiment of the present disclosure.

FIG. 8 is a flowchart showing a vehicle control method according to an embodiment of the present disclosure.

Referring to FIG. 8, the vehicle control method includes, by the image sensor 110 disposed in the vehicle 300 to have a field of view of the inside or the outside of the vehicle 300, capturing image data and processing the captured image data (S810); and controlling, by the controller 100, the vehicle 300 according to the state of a child existing in the vehicle 300 on the basis of at least part of a processing of the image data (S820).

In detail, the operation S820 of controlling the vehicle 300 may include determining whether the occupant is a child on the basis of the occupant sensing area 420 included in the basic sensing area 410 acquired by the processing result of the image data.

In addition, the operation S820 of controlling the vehicle 300 may include determining whether the state of the child is a dangerous situation when the occupant 430 is determined to be a child.

In addition, the operation S820 of controlling the vehicle 300 may include controlling the vehicle 300 in response to the determined dangerous situation.

FIG. 9 is a flowchart showing a vehicle control method according to another embodiment of the present disclosure.

Referring to FIG. 9, the controller 100 detects an occupant in the vehicle 300 (S910). For example, the image sensor 110 disposed inside the vehicle 300 captures and processes image data, and the controller 100 extracts the occupant sensing area 420 from the basis sensing area 410 acquired by a result of processing of the image data, so that the occupant 430 is sensed.

When the occupant 430 is detected, the controller 100 determines whether the detected occupant 430 is a child (S920). For example, the controller 100 determines the occupant 430 to be a child when the ratio of the occupant sensing area 420 to the basic sensing area 410 is less than or equal to a previously set reference ratio.

Thereafter, the controller 100 checks whether the child is left alone for a predetermined time (S930).

When the child is left alone in the vehicle 300 for the predetermined time or more, the controller 100 generates and outputs a notification signal to warn the driver (or guardian) (S940). In detail, the controller 100 generates a notification signal and outputs the generated notification signal to the communication module 130, and transmits the notification signal to the mobile communication terminal 230 of the driver (or guardian) through the communication module 130.

Thereafter, the controller 100 determines whether the state of the child left alone in the vehicle 300 corresponds to a dangerous situation (S950). For example, the controller 100 detects at least one of the torso central point 610 and the head central point 620 of the occupant 430 in the occupant sensing area 420, calculates the amount of the extracted central point moved per unit time to identify the movement of the occupant 430, and when the amount of the extracted central point moved per unit time is less than or equal to the previously set reference movement amount, determines that the state of the child is a dangerous situation.

When the state of the child corresponds to a dangerous situation, the controller 100 operates an air conditioner, opens a window, or generates a burglar alarm sound such that the child escapes from the dangerous situation (S960).

Thereafter, when the state of the child is determined to deteriorate, the controller 100 generates and outputs a rescue signal to request a rescue from the rescue center 250, for example, a fire department (S970). In detail, the controller 100 generates a rescue signal and outputs the generated rescue signal to the communication module 130, and transmits the rescue signal to the rescue center 250 through the communication module 130.

As described above, the present disclosure may provide the vehicle control system and the vehicle control method capable of accurately detecting a child among occupants in a vehicle.

Further, the present disclosure may provide the vehicle control system and the vehicle control capable of accurately detecting a child in a vehicle, and when the child is left alone in the vehicle, notifying a driver, a guardian, and the like that the child is left alone in the vehicle or identifying the state of the child and performing a rescue request, thereby preventing a safety accident.

As is apparent from the above, the vehicle control system and the vehicle control method can accurately detect a child among occupants in a vehicle.

In addition, the vehicle control system and the vehicle control method can accurately detect a child in a vehicle, and notify a driver, a guardian, or the like of the existence of the child in the vehicle or perform a rescue request, thereby preventing the safety accident.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. For example, suitable results may be achieved even when the described techniques are performed in a different order and/or components in a described system, structure, apparatus, circuit and the like are combined in a different manner and/or replaced or supplemented by other components or their equivalents. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A vehicle control system comprising:
one or more image sensors disposed on a vehicle to have a field of view of an inside of the vehicle; and
a controller connected to the image sensor to perform communication, and configured to:
control the vehicle according to a state of a child existing in the vehicle,
recognize an occupant sensing area on the basis of image data generated by the image sensor,
determine whether an occupant is the child on the basis of the occupant sensing area,
in response to determining that the occupant is the child, determine whether the state of the child is a dangerous situation on the basis of at least one of an existence of the child alone in the vehicle for a predetermined reference time or more and a movement of the child, and in response to determining that the state of the child is a dangerous situation, control the vehicle according to an indoor state of the vehicle, wherein the controller is further configured to:
generate at least one of a torso central point of a torso and a head central point of a head of the occupant in the occupant sensing area,
identify a movement of the occupant by calculating an amount of the generated central point moved per unit time, and
determine the state of the child to be a dangerous situation when the amount of the generated central point moved per unit time is less than or equal to a predetermined reference movement amount.

2. The vehicle control system of claim 1, wherein the controller is configured to:
estimate a size of an upper body of the occupant by calculating an area of the occupant sensing area; and
determining the occupant to be the child when the estimated size of the upper body is below a predetermined reference size value.

3. The vehicle control system of claim 1, wherein the controller is configured to:
extract a length of an upper body of the occupant from the occupant sensing area; and
determine the occupant to be the child when the length of the upper body of the occupant is below a predetermined reference length value.

4. The vehicle control system of claim 1, wherein the controller determines the occupant to be the child when a ratio of an area occupied by the occupant sensing area in an image is less than or equal to a predetermined reference ratio.

5. The vehicle control system of claim 1, wherein the controller is configured to:
extract an upper body length corresponding to an upper body of the occupant and shoulder length corresponding to a shoulder of the occupant from the occupant sensing area;
generate a determination index on which the upper body length and the shoulder length are reflected; and
determine the occupant to be the child when the determination index is less than or equal to a predetermined reference determination index.

6. The vehicle control system of claim 1, wherein the controller is configured to:
distinguish a head sensing area corresponding to a head of the occupant from a torso sensing area corresponding to the torso of the occupant in the occupant sensing area; and
determine the occupant to be the child when a ratio of the head sensing area to the torso sensing area is greater than or equal to a predetermined reference ratio.

7. The vehicle control system of claim 1, wherein the controller is configured to:
distinguish a head sensing area corresponding to a head of the occupant from a full body sensing area corresponding to a full body of the occupant in the occupant sensing area; and
determining the occupant to be the child when a ratio of the head sensing area to the full body sensing area is greater than or equal to a predetermined reference ratio.

8. The vehicle control system of claim 1, wherein the image sensor includes a plurality of image sensors, and plurality of image sensors are disposed on the vehicle to have fields of view of a plurality of seats installed in the vehicle, wherein the controller determines whether the child exists alone in the vehicle on the basis of a plurality of pieces of data sensed by the plurality image sensors, respectively.

9. The vehicle control system of claim 8, wherein the controller generates an alarm signal for performing an alarm operation in the vehicle when the child exits in the vehicle for the predetermined reference time or more, and outputs the generated alarm signal.

10. The vehicle control system of claim 1, wherein the controller is configured to:
generate the torso central point with respect to the upper body of the occupant in the occupant sensing area; and
detect the head central point with respect to the head sensing area generated in the occupant sensing area.

11. The vehicle control system of claim 1, wherein the controller is configured to:
set a connecting line connecting the torso central point to the head central point; and
compare a characteristic of the connecting line including at least one of a movement trajectory, a size, and a shape of the connecting line with a previously stored normal model, and in response to mismatch of the characteristic and the previously stored normal model, determine the state of the child to be a dangerous situation.

12. The vehicle control system of claim 1, further comprising a temperature sensor configured to sense an indoor temperature of the vehicle,
wherein the controller is configured to:
in response to determining the state of the child to be a dangerous situation, control the vehicle to operate an air conditioner disposed in the vehicle when the indoor temperature is higher than or equal to a previously set first reference temperature, and
in response to determining the state of the child to be a dangerous situation, control the vehicle to operate a heater disposed in the vehicle when the indoor temperature is lower than or equal to a previously set second reference temperature.

13. The vehicle control system of claim 1, further comprising an oxygen concentration sensor configured to sense an indoor oxygen concentration of the vehicle,
wherein the controller is configured to, in response to determining the state of the child to be a dangerous situation, control the vehicle to open at least one of a window and a sunroof of the vehicle when the oxygen concentration sensed by the oxygen concentration sensor is lower than or equal to a previously set reference concentration.

14. The vehicle control system of claim 1, further comprising a communication module configured to communicate with a rescue center,
wherein the controller is configured to, in response to determining the state of the child to be a dangerous situation, generate a rescue signal for requesting a rescue from the rescue center and output the generated rescue signal.

15. The vehicle control system of claim 1, further comprising a communication module configured to communicate with a mobile communication terminal of a guardian,
wherein the controller, in response to determining the state of the child to be a dangerous situation, generates a notification signal for providing image data including an image of the child and providing the mobile communication terminal with the generated notification signal.

16. A vehicle control method comprising:
sensing, by one or more image sensors disposed on a vehicle to have a field of view of an inside of the vehicle, sensing an inside of the vehicle;
recognizing, by a controller, an occupant sensing area on the basis of image data generated by the image sensor;
determining, by the controller, whether an occupant is the child on the basis of the occupant sensing area;
determining, by the controller, whether the state of the child is a dangerous situation on the basis of at least one of an existence of the child alone in the vehicle for a predetermined reference time or more and a movement of the child in response to determining that the occupant is the child; and
controlling, by the controller, the vehicle according to the determined dangerous situation,
wherein the determining, by the controller, whether the state of the child is a dangerous situation comprises:
generating at least one of a torso central point of a torso and a head central point of a head of the occupant in the occupant sensing area,
identifying a movement of the occupant by calculating an amount of the generated central point moved per unit time, and
determining the state of the child to be a dangerous situation when the amount of the generated central point moved per unit time is less than or equal to a predetermined reference movement amount.

17. A non-transitory computer readable storage medium that records executable instructions that, when executed by a processor of a computer, controls the computer to execute operations comprising:
recognizing, an occupant sensing area on the basis of image data generated by an image sensor disposed on a vehicle to have a field of view of an inside of the vehicle;
determining, whether an occupant is the child on the basis of the occupant sensing area;
determining, whether the state of the child is a dangerous situation on the basis of at least one of an existence of the child alone in the vehicle for a predetermined reference time or more and a movement of the child in response to determining that the occupant is the child; and
controlling, the vehicle according to the determined dangerous situation,
wherein the operation to determine whether the state of the child is a dangerous situation comprises:
generating at least one of a torso central point of a torso and a head central point of a head of the occupant in the occupant sensing area,
identifying a movement of the occupant by calculating an amount of the generated central point moved per unit time, and
determining the state of the child to be a dangerous situation when the amount of the generated central point moved per unit time is less than or equal to a predetermined reference movement amount.

\* \* \* \* \*